United States Patent
Hwangbo

[11] Patent Number: 6,081,871
[45] Date of Patent: Jun. 27, 2000

[54] CACHE SYSTEM CONFIGURABLE FOR SERIAL OR PARALLEL ACCESS DEPENDING ON HIT RATE

[75] Inventor: Jong-Tae Hwangbo, Incheon, Rep. of Korea

[73] Assignee: Daewoo Telecom Ltd., Incheon, Rep. of Korea

[21] Appl. No.: 09/095,746

[22] Filed: Jun. 11, 1998

[30] Foreign Application Priority Data

Aug. 21, 1997 [KR] Rep. of Korea ................. 97-39849

[51] Int. Cl.⁷ ........................................... G06F 12/08
[52] U.S. Cl. ............................................... 711/118
[58] Field of Search ........................ 711/118, 170, 711/137

[56] References Cited

U.S. PATENT DOCUMENTS 5,249,282 9/1993 Segers ............................... 395/425
5,761,715 6/1998 Takahashi ......................... 711/128
5,978,888 11/1999 Arimilli et al. .................... 711/128

*Primary Examiner*—Eddie P. Chan
*Assistant Examiner*—Kevin Verbrugge
*Attorney, Agent, or Firm*—Bacon & Thomas, PLLC

[57] ABSTRACT

A data processing system having a CPU (central processing unit), a system bus and a main memory connected to the system bus, comprises a cache memory connected to the system bus for storing a predetermined part of data stored at the main memory, a first path unit for coupling the CPU with the cache memory, a second path unit for connecting the CPU to the system bus, and controller for enabling one of the first and the second path units. In the data processing system, the main memory is accessed only if a cache miss occurs while the first path unit is enabled, and the main memory and the cache memory are accessed simultaneously while the second path unit is enabled.

4 Claims, 2 Drawing Sheets

CACHE SYSTEM CONFIGURABLE FOR SERIAL OR PARALLEL ACCESS DEPENDING ON HIT RATE

FIELD OF THE INVENTION

The present invention relates to a data processing system; and, more particularly, to a data processing system capable of switching a cache memory access form thereof.

BACKGROUND OF THE INVENTION

As well known in the art, a cache memory is employed to increase the performance of a data processing system when a CPU (central processing unit) requires a large bandwidth to communicate with a main memory. To effectively increase the memory bandwidth, the cache memory stores frequently used instructions and data stored at the main memory. Typically, the cache memory is constructed by a SRAM (static random access memory) to have an access time shorter than that of the main memory constructed by a DRAM (dynamic random access memory). As a result, the system performance is improved since the CPU idle time is reduced due to some of the data being read from the cache memory.

In the conventional data processing system, the cache memory is accessed by the CPU in one of two cache memory access forms: that is, a cache memory parallel-access form and a cache memory serial-access form, which will be described below.

FIG. 1 provides a block diagram of the data processing system 100 for illustrating the cache memory parallel-access form. The data processing system 100 comprises a CPU 102, a cache memory 104, a main memory 106, a DMA (direct memory access) 108 and an I/O (input/output) module 110, each being connected to a system bus 112 for communication with another block.

In the parallel-access form as shown in FIG. 1, an address for data desired by the CPU 102 is provided to the cache memory 104 and the main memory 106 via the system bus 112 simultaneously. Then, a cache memory access cycle and a main memory access cycle are initiated simultaneously. As described above, the access time for the cache memory access cycle is much shorter than the access time for the main memory access cycle.

If the desired data is stored at the cache memory 104, i.e., a cache hit occurs, the CPU 102 is provided with the desired data from the cache memory 104 and stops without completing the main memory access cycle. If not, i.e., a cache miss occurs, the CPU 102 is provided with the desired data from the main memory 106 by completing the main memory access cycle. And also, the cache memory 104 stores the data provided to the CPU 102 for further use.

In other words, the maximum access time in the parallel-access form is the access time of the main memory access cycle since the CPU 102 accesses both memories 104 and 106 simultaneously.

However, in the parallel-access form, the CPU 102 occupies the system bus 112 when the cache hit occurs as well as when the cache miss occurs. Therefore, the system bus efficiency is low since other bus masters, e.g., the DMA 108 and the I/O module 110, cannot occupy the system bus 112 whenever the CPU 102 has an access thereto. And, the CPU 102 cannot access the cache memory while another bus master occupies the system bus 112.

Referring to FIG. 2, there is provided a block diagram of a data processing system 200 for illustrating the cache memory serial-access form. The data processing system 200 comprises a cache memory 204, a main memory 206, a DMA 208 and an I/O (input/output) module 210, each being connected to a system bus 212, and the CPU 202 coupled with the cache memory 204.

In the serial-access form as shown in FIG. 2, the address for the data desired by the CPU 202 is provided to the cache memory 204 first. If the cache hit occurs, the CPU 202 is provided with the desired data without further delay.

If the cache miss occurs, the address is provided from the cache memory 204 to the main memory 206 via the system bus 212. And then, the desired data is retrieved from the main memory 206 to be stored in the cache memory 204 for further use and finally provided to the CPU 202.

Since the CPU 202 checks first the cache memory 204, the DMA 208 and the I/O module 210 can access the main memory via the system bus 212 during the cache memory access of the CPU 202.

However, in the serial-access form, the maximum access time is the sum of the access time of the cache memory access cycle and the main memory access cycle since the main memory access cycle is initiated after the cache miss occurs. In other words, the CPU idle time is increased by the time delay due to the cache miss.

SUMMARY OF THE INVENTION

It is, therefore, a primary object of the present invention to provide a data processing system capable of switching a cache memory access form according to a cache hit rate, to thereby reduce the CPU idle time and increase the system bus efficiency.

In accordance with the present invention, there is provided a data processing system having a CPU, a system bus and a main memory connected to the system bus, comprising:

a cache memory connected to the system bus for storing a predetermined part of data stored at the main memory;

a first path for coupling the CPU with the cache memory;

a second path for connecting the CPU to the system bus; and a controller for enabling one of the first and the second paths, wherein the main memory is accessed only if a cache miss occurs while the first means is enabled, and the main memory and the cache memory are accessed simultaneously while the second path is enabled.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
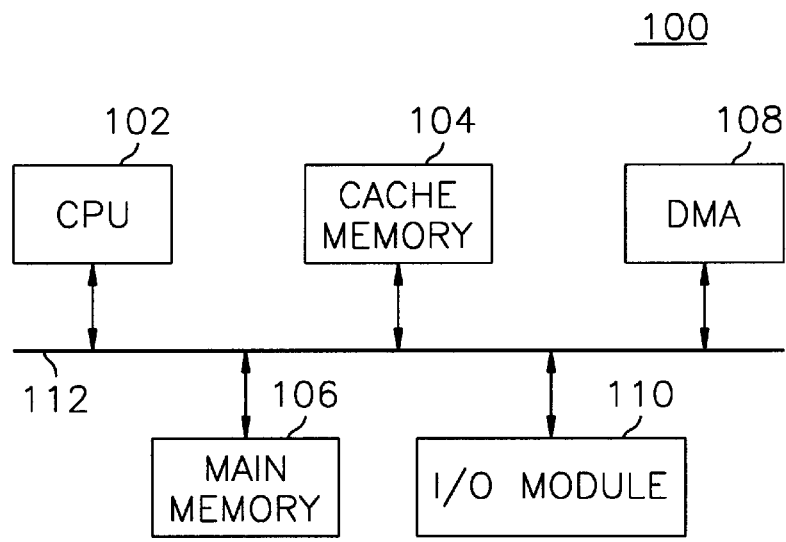
FIG. 1 presents a block diagram of a conventional data processing system in the cache memory parallel-access form.
Figure 2:
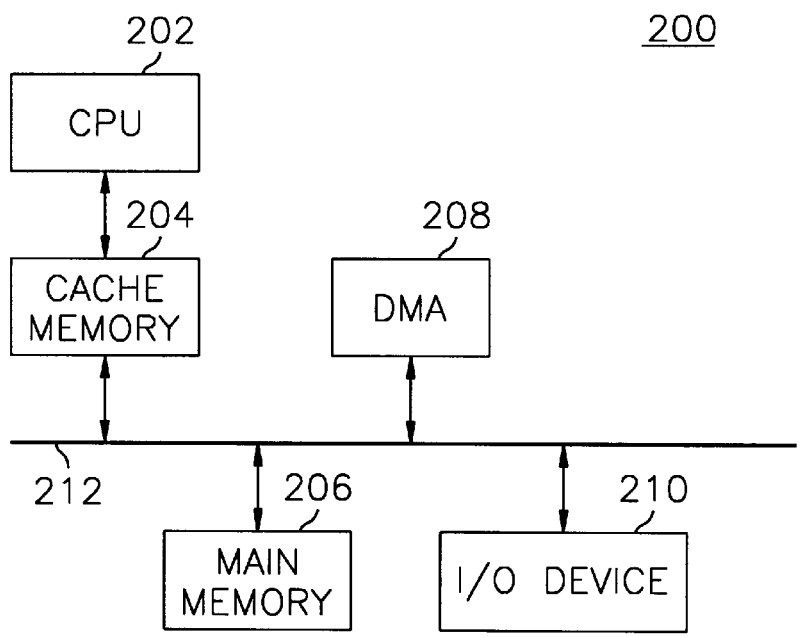
FIG. 2 provides a block diagram of another conventional data processing system in the cache memory serial-access form.
Figure 3:
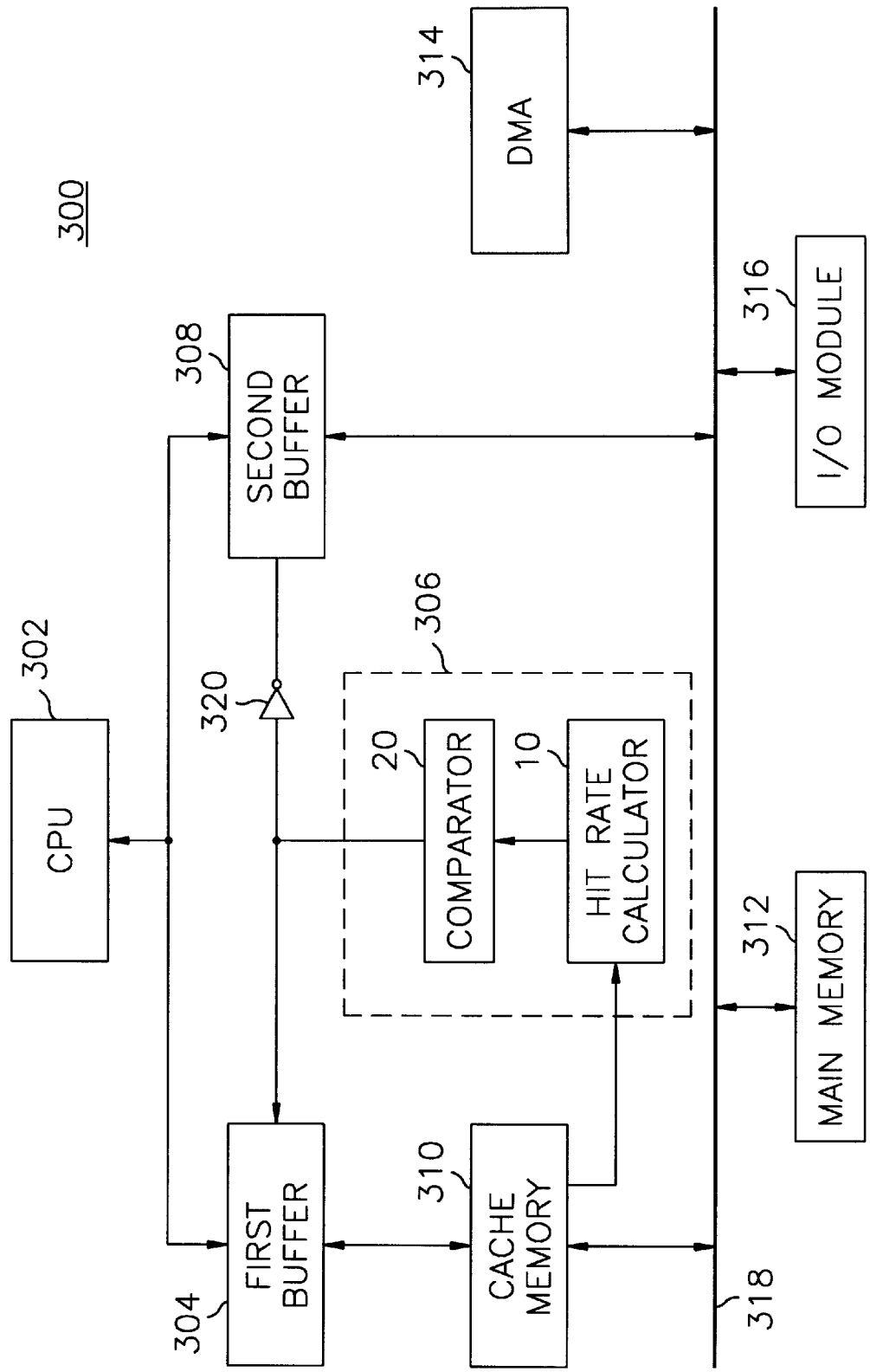
FIG. 3 offers a block diagram of a data processing system in accordance with the present invention.

Referring to FIG. 3, there is provided a block diagram of a data processing system of the present invention, which comprises a CPU (central processing unit) 302, a first buffer 304, a cache access controller 306, a second buffer 308, a cache memory 310, a main memory 312, a DMA (direct memory access) 314, an I/O (input/output) module 316, a system bus 318 and an inverter 320. The cache access controller 306 includes a hit rate calculator 10 and a comparator 20.

The CPU 302 reads data stored at one of the cache memory 310 and the main memory 312 and performs instructions included in the data read.

The cache memory 310 is typically constructed by a SRAM (static random access memory) having small capacity and short access time. Frequently used data stored at the main memory 312 are stored at the cache memory 310. Upon cache access cycle, a hit/miss signal is provided from the cache memory 310 to the hit rate calculator 10.

The main memory 312 is conventionally constructed by a DRAM (dynamic random access memory) having large capacity and long access time. Data stored at the main memory 312 can be provided to bus masters, the CPU 302, the cache memory 310, the DMA 314 and the I/O module 316, via the system bus 318.

The cache access controller 306 is coupled with the cache memory 310 to switch the cache access form by using the hit/miss signal from the cache memory 310. The hit rate calculator 10 of the cache access controller 306 calculates a cache hit rate by dividing the number of cache hit occurrences by a sum of the number of cache hit occurrences and the number of cache miss occurrences, all numbers accumulated so far. The calculated cache hit rate is compared with a predetermined threshold at the comparator 20. According to the comparison result, one of the buffers 304 and 308 is enabled to construct one of the cache memory access forms. In FIG. 3, an enable signal is provided to the first buffer 304 and an inverted enable signal thereof is provided to the second buffer 308 via the inverter 320, to exclusively enable the buffers 304 and 308.

When the first buffer 304 is enabled and the second buffer 308 is disabled, the data processing system 300 is operated in the cache memory serial-access form. That is, the CPU 302 provides an address for the desired data to the cache memory 310 via the first buffer first. If a cache hit occurs, the desired data is provided from the cache memory 310 to the CPU 304 and there is no further delay. If a cache miss occurs, the address is provided from the cache memory 310 to the main memory 312 and then the desired data is provided from the main memory 312 to the CPU 302 via the cache memory 310 for storage therein for further use and the first buffer 304.

On the other hand, when the second buffer 308 is enabled and the first buffer 304 is disabled, the data processing system 300 is operated in the cache memory parallel-access form. That is, the CPU provides the address for the desired data to the cache memory 310 and the main memory 312 simultaneously via the second buffer 308 and the system bus 318. If the cache hit occurs, the desired data is provided to the CPU 302 from the cache memory 310 via the system bus 312 and the second buffer 308 and main memory access cycle is stopped without being completed. If the cache miss occurs, the main memory cycle is completed and the desired data is provided from the main memory 312.

Hereinafter, the operation for switching the cache access form in the data processing system 300 will be described with reference to FIG. 3.

Initially, the data processing system 300 is operated in the serial-access form. That is, when the system 300 is turned on, an active enable signal and an inverted signal thereof are provided to the first buffer 304 and the second buffer 308, respectively, from the cache access controller 306.

When the first buffer 304 is enabled and the second buffer 308 is disabled, the address for data desired by the CPU 302 is provided to the cache memory 310 via the first buffer 304.

At every memory access, the hit/miss signal is provided to the hit rate calculator 10 to generate the cache hit rate. The hit rate calculator 10 divides the number of cache hit occurrences by the sum of the number of cache hit occurrences and the number of cache miss occurrences as described above.

At the comparator 20, the calculated hit rate is compared with a predetermined threshold value. To be specific, it determines whether or not the cache hit rate is higher than the predetermined threshold value at every data read operation at the cache access controller 306.

While the cache hit rate is equal to or higher than the predetermined threshold value, the enable signal from the comparator 20 remains in an active state, i.e., the system 300 is operated in the serial-access form.

When the cache hit rate becomes lower than the predetermined threshold value, the cache access controller 306 switches the cache access form to the parallel-access form. The comparator 20 provides the enable signal of a non-active state to the first buffer 304 and its inverted signal of the active state to the second buffer 308.

The hit/miss signal is also provided from the cache memory 310 to the hit rate calculator 10 in the parallel-access form at every read operation.

While the cache hit rate is lower than the predetermined threshold value, the enable signal from the comparator 20 remains in the non-active state, i.e., the system 300 is operated in the parallel-access form.

As described above, the cache access controller 306 allows the data processing system 300 to be operated in the serial cache access form when the cache hit rate is high by enabling the first buffer 304 and disabling the second buffer 308. And the cache access controller 306 allows the data processing system 300 to be operated in the parallel cache access form when the cache miss rate is low by enabling the second buffer 308 and disabling the first buffer 304. Therefore, the system performance is improved because the cache access form can be switched by a program type processed by the CPU 302.

While the cache hit rate is low, the data processing system 300 is operated in the parallel cache access form, i.e., the second buffer 308 is enabled by the cache access controller 306, and an address from the CPU 304 is transferred to both of the cache memory 310 and the main memory 312. When the cache hit occurs, the main memory access cycle is stopped without being completed and the CPU 302 reads the desired data from the cache memory 310. When the cache miss occurs, the main memory access cycle is completed and data retrieved from the main memory 312 is read by the CPU 302. In the parallel access form, maximum access time is main memory access time since the cache memory and the main memory is accessed simultaneously and cache access time is shorter than the main access time.

While the cache hit rate is high, the data processing system 300 is operated in the serial cache access form, i.e., the first buffer 304 is enabled by the cache access controller 306, and an address from the CPU 304 is transferred to the cache memory 310 first. When the cache hit occurs, the CPU 302 reads the desired data from the cache memory 310 without any further delay. When the cache miss occurs, the main memory access cycle is initiated and data retrieved from the main memory 312 is read by the CPU 302 and is stored at the cache memory 310 for further use.

In the present invention, the system performance is improved because the capacity of the CPU 302 can be effectively utilized. Particularly, since the CPU 302 is provided with the desired data from the cache memory 310 when the cache hit rate is high, the other bus masters, such as the DMA 314 and the I/O module 316, can occupy the system bus 318. And also, since the CPU 302 accesses the both of the memories 310 and 312 at a time when the cache hit rate is low, there is no more delay than the main access time when the cache miss occurs.

As described above, the present invention reduces the memory access time of the CPU 302 and increases the usage efficiency of the system bus 318 so that the system performance is improved thereby.

While the present invention has been shown and described with respect to the particular embodiments, it will be apparent to those skilled in the art that many changes and modifications may be made without departing from the spirit and scope of the invention as defined in the appended claims.

What is claimed is:

1. A data processing system having a CPU (central processing unit), a system bus and a main memory connected to the system bus, comprising:

a cache memory connected to the system bus for storing a predetermined part of data stored at the main memory;

a first path means for coupling the CPU with the cache memory;

a second path means for connecting the CPU to the system bus; and controlling means for enabling one of the first and the second path means, wherein the main memory is accessed only if a cache miss occurs while the first path means is enabled, and the main memory and the cache memory are accessed simultaneously while the second path means is enabled.

2. The data processing system of claim 1, wherein the controlling means includes:

means coupled to the cache memory for determining whether a cache hit or a cache miss occurs;

means for calculating a cache hit rate whenever the cache hit or the cache miss occurs;

means for comparing the cache hit rate with a predetermined threshold value;

means for enabling the first path means and disabling the second path means if the cache hit rate is equal to or higher than the predetermined threshold value; and means for enabling the second path means and disabling the first path means if the cache hit rate is lower than the predetermined threshold value.

3. The data processing system of claim 2, wherein the calculating means includes:

means for accumulating the number of cache hit occurrences and the number of cache miss occurrences, respectively;

means for summing up the accumulated numbers of cache hit and cache miss occurrences; and means for dividing the accumulated number of the cache hit occurrences by the summed up value.

4. The data processing system of claim 1, wherein the cache memory includes a SRAM (static random access memory).

* * * * *